J. T. DAVIS.
PROCESS OF MAKING COFFEE EXTRACT.
APPLICATION FILED FEB. 5, 1912.
1,079,474.
Patented Nov. 25, 1913.
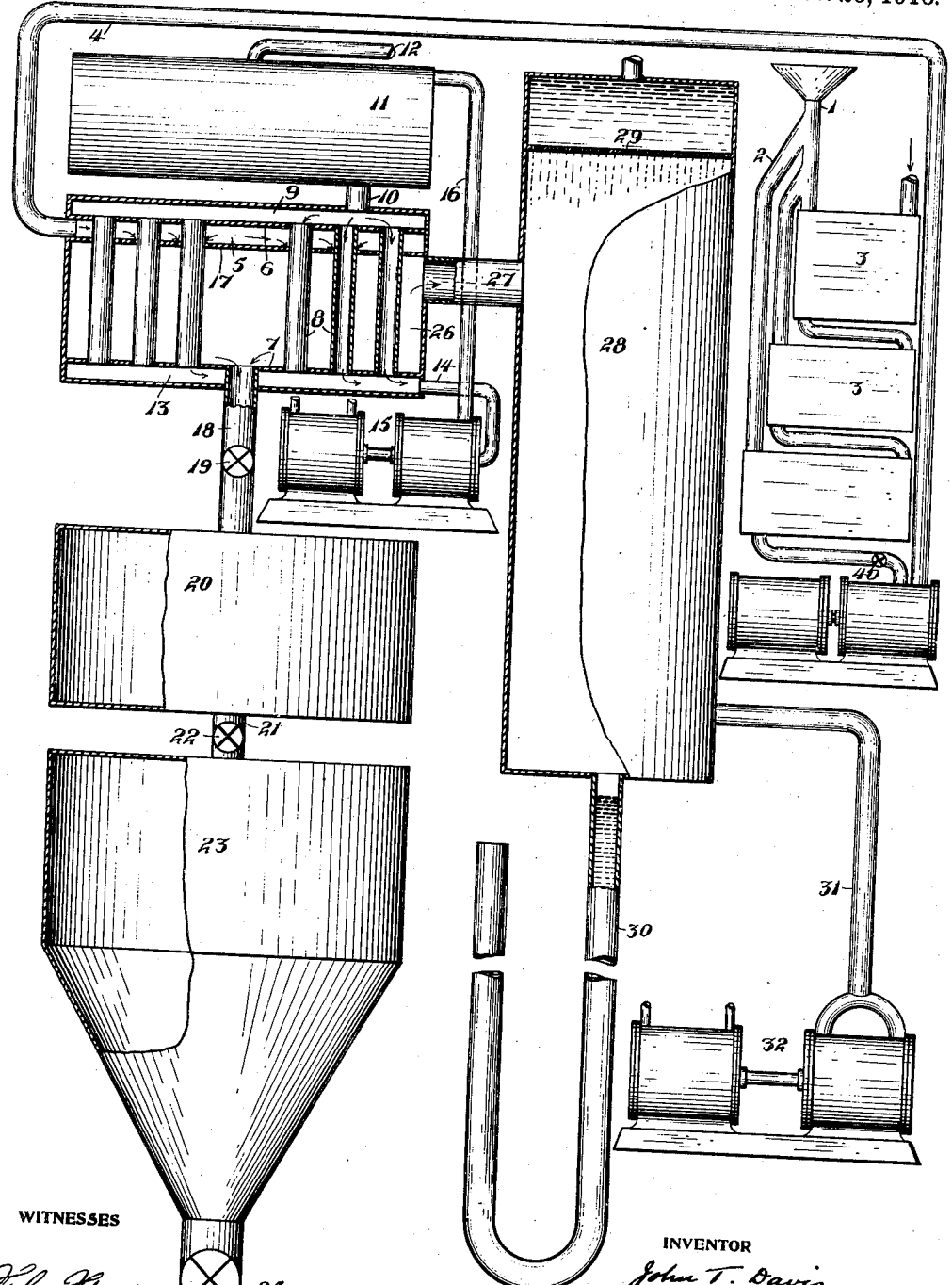
WITNESSES
INVENTOR
John T. Davis
BY
ATTORNEY

UNITED STATES PATENT OFFICE.

JOHN T. DAVIS, OF SAN FRANCISCO, CALIFORNIA, ASSIGNOR TO DAVIS OIL REFINING CO., OF SAN FRANCISCO, CALIFORNIA, A CORPORATION OF CALIFORNIA.

PROCESS OF MAKING COFFEE EXTRACT.

1,079,474.  Specification of Letters Patent.  Patented Nov. 25, 1913.

Application filed February 5, 1912. Serial No. 675,586.

*To all whom it may concern:*

Be it known that I, JOHN T. DAVIS, a citizen of the United States, residing at San Francisco, in the county of San Francisco and State of California, have invented new and useful Improvements in Processes of Making Coffee Extract, of which the following is a specification.

This invention relates to an improved process of making coffee extract, the object of the invention being to obtain such an extract free from the bitter and disagreeable essential oils of coffee which are driven off at the high temperatures usually employed in making such extracts.

In the accompanying drawing, the figure is a vertical sectional view of an apparatus for carrying out my improved process.

Referring to the drawing, 1 indicates a conduit, having branches 2, by which pulverized roasted coffee is supplied by gravity to each of a series of infusing vessels 3. Through said vessels in succession is slowly passed a stream of water at a temperature of 165° F. or thereabout, the vessels being maintained filled with the water by a properly regulated valve 40, the water at this temperature infusing the coffee and extracting therefrom the more aromatic and agreeable oils. After leaving said series of vessels, the coffee infusion flows by a pipe 4 into the upper portion of a vaporizing chamber 5, preferably of a cylindrical form, having horizontal diaphragms 6, 7, near the top and bottom respectively, said diaphragms being connected by a large number of vertical open-ended tubes 8. Into the upper chamber 9, between the top of the vaporizer and the upper diaphragm 6, hot water flows, being conducted by a pipe 10 from a hot water tank 11, having a steam connection 12 for maintaining hot the water in said tank. From the lower chamber 13, between the bottom of the vaporizer and the lower diaphragm, the water is conducted by a pipe 14 to a hot water pump 15, by which pump it is forced up a pipe 16 and back to the hot water tank 11. The temperature of the hot water passing through the tubes 8 is maintained considerably lower than boiling point, 165° F. being the preferred temperature.

At a short distance below the upper diaphragm 6 is a diaphragm 17 extending across the vaporizer and formed with apertures through which the tubes 8 pass without touching. Connected to the diaphragm 7 is a discharge conduit 18 having a valve 19 therein, which conduit leads to a tank 20, from the bottom of which tank leads a conduit 21, having a valve 22 therein, and leading to a second tank 23 having a discharge outlet 24 and a valve 25 therein. From the upper portion of the chamber 26, between the diaphragms 17 and 7, a vapor pipe 27 leads to a condenser 28, having above the entrance to said pipe 27 a horizontal perforated diaphragm 29 for permitting cold water to pass through in the form of a spray, which cold water is supplied from any suitable source. The water, after having performed its office, flows from the condenser by a pipe 30, which pipe must be of a height of 32 feet, or thereabout, above its outlet, for the reason that the condenser is maintained under a more or less perfect vacuum, this result being effected by a pipe 31 leading to a vacuum pump 32.

The coffee berries, having been roasted, are then pulverized, and an infusion is made therefrom in the manner already described. This infusion is discharged into the chamber 5, and falls through the narrow annular openings in the diaphragm 17 around the tubes 8 and into the chamber 26. While so falling, it is evaporated by the heat of the hot water in the tubes 8, maintained at a comparatively low temperature, namely, 165° F. or thereabout, assisted by the more or less perfect vacuum produced by the suction pump 32, causing the liquid coffee extract to be concentrated. When it has been sufficiently concentrated, it is drawn into the receiving tanks 20, 23, in succession, two such tanks being provided for a greater convenience. Steam produced by the evaporation is condensed by the cold water spray and is discharged at any suitable point.

The value of this process consists in the fact that at no stage of the process, from the infusion of the pulverized coffee berries to the final concentration of the extract, is the aroma of the coffee permitted to escape. It will be observed that the extract is compelled to travel, from the beginning to the end of the apparatus, in a conduit which is not open to the atmosphere and is always maintained at less than atmospheric pressure.

I claim:—

1. The method of preparing coffee extract which consists in infusing roasted pulverized coffee berries with hot water at a temperature of 165° F., and then evaporating the water therefrom by the application of heat at a temperature of 165° F. to the mixture at less than atmospheric pressure.

2. The method of preparing coffee extracts which consists in infusing roasted pulverized coffee berries with hot water at a temperature of not more than 170° F., evaporating the water therefrom by the application to the mixture of heat at a temperature of not more than 170° F. and at all times, from the beginning to the end of said process, maintaining the coffee extract at a pressure less than atmospheric.

In testimony whereof I have hereunto set my hand in the presence of two subscribing witnesses.

JOHN T. DAVIS.

Witnesses:
 FRANCIS M. WRIGHT,
 D. B. RICHARDS.